(12) United States Patent
Miller et al.

(10) Patent No.: US 9,718,689 B2
(45) Date of Patent: Aug. 1, 2017

(54) CARBONIZED CARBON AND ARTICLES FORMED THEREFROM

(71) Applicant: Aemerge LLC, Fortville, IN (US)

(72) Inventors: Landon C. G. Miller, Fortville, IN (US); Scott Behrens, Fortville, IN (US); Brian Rayles, Fortville, IN (US)

(73) Assignee: AEMERGE LLC, Fortville, IN (US)

( * ) Notice: Subject to any disclaimer, the term of this patent is extended or adjusted under 35 U.S.C. 154(b) by 0 days.

(21) Appl. No.: 14/782,543

(22) PCT Filed: Apr. 7, 2014

(86) PCT No.: PCT/US2014/033163
§ 371 (c)(1),
(2) Date: Oct. 5, 2015

(87) PCT Pub. No.: WO2014/165843
PCT Pub. Date: Oct. 9, 2014

(65) Prior Publication Data
US 2016/0060114 A1     Mar. 3, 2016

Related U.S. Application Data

(60) Provisional application No. 61/808,628, filed on Apr. 5, 2013.

(51) Int. Cl.
| | | |
|---|---|---|
| C01B 31/00 | (2006.01) | |
| C09K 17/02 | (2006.01) | |
| C10B 31/02 | (2006.01) | |
| C08K 3/04 | (2006.01) | |
| C01B 31/02 | (2006.01) | |
| C05D 9/00 | (2006.01) | |
| C10L 5/44 | (2006.01) | |
| C10L 9/08 | (2006.01) | |
| C10L 1/32 | (2006.01) | |
| C09C 1/44 | (2006.01) | |

(52) U.S. Cl.
CPC .............. *C01B 31/00* (2013.01); *C01B 31/02* (2013.01); *C05D 9/00* (2013.01); *C08K 3/04* (2013.01); *C09C 1/44* (2013.01); *C09K 17/02* (2013.01); *C10L 1/326* (2013.01); *C10L 5/442* (2013.01); *C10L 5/445* (2013.01); *C10L 9/08* (2013.01); *C01P 2002/72* (2013.01); *C01P 2006/62* (2013.01); *C10L 2250/08* (2013.01); *C10L 2290/06* (2013.01); *Y02E 50/10* (2013.01); *Y02E 50/30* (2013.01)

(58) Field of Classification Search
USPC ............ 423/44 R; 428/402; 44/280; 524/496
See application file for complete search history.

(56) References Cited

U.S. PATENT DOCUMENTS

| | | | |
|---|---|---|---|
| 5,721,308 A | 2/1998 | Yamamoto et al. | |
| 2007/0246419 A1* | 10/2007 | Milosavljevic | B01D 46/0023 210/284 |
| 2008/0011662 A1* | 1/2008 | Milosavljevic | B01D 46/0023 210/284 |
| 2011/0217544 A1* | 9/2011 | Young | B29C 37/0032 428/327 |

FOREIGN PATENT DOCUMENTS

| | | |
|---|---|---|
| CN | 101402454 A | 4/2009 |
| CN | 102491325 A | 6/2012 |
| WO | 0149604 A1 | 7/2001 |
| WO | 2014008100 A1 | 1/2014 |

OTHER PUBLICATIONS

Huang, Jan-Chan "Carbon Black Filled Conducting Polymers and Polymer Blends, Advanced in Polymer Technology", 2002, vol. 21, No. 4, pp. 299-313, see abstract, p. 300.
Ungar, Tamas; Gubicza, Jeno; Ribarik, Gabor; Pantea, Cristian, Zerda, T. Waldek; "Microstructure of carbon blacks determined by X-ray diffraction profile analysis", Pergamon, Carbon 40 (2002) pp. 929-927; © 2002 Elsevier Science Ltd.; All rights reserved.

* cited by examiner

*Primary Examiner* — Prem C Singh
*Assistant Examiner* — Chantel Graham
(74) *Attorney, Agent, or Firm* — Avery N. Goldstein; Blue Filament Law PLLC (57) ABSTRACT

A composition is provided that includes: a carbonized carbon having an iodine number of at least 60 mg/g and a domain size of between 1.0 and 2.3 nm. An article or fuel is provided that includes the composition in a polymer forming a matrix or water suspension, respectively. A composition of so provided and derived from wood has been assigned a new CAS number (CAS No. 1362167-53-0).

17 Claims, 7 Drawing Sheets

Solvent Based Acrylic-Modified Alkyd Dispersions

| Sample ID | White Background | | | Black Background | | |
|---|---|---|---|---|---|---|
| | L | a | b | L | a | b |
| AEMERGE B | 75.07 | -0.87 | -2.58 | 75.1 | -0.89 | -2.59 |
| AEMERGE B | 75.06 | -0.87 | -2.57 | 75.08 | -0.87 | -2.61 |
| AEMERGE B | 75.17 | -0.87 | -2.59 | 75.18 | -0.88 | -2.66 |
| AEMERGE B | 75.07 | -0.88 | -2.59 | 75.16 | -0.88 | -2.61 |
| AEMERGE B | 75.14 | -0.87 | -2.58 | 75.16 | -0.88 | -2.64 |
| AEMERGE B | 75.06 | -0.88 | -2.58 | 75.15 | -0.91 | -2.6 |

CARBONIZED CARBON AND ARTICLES FORMED THEREFROM

RELATED APPLICATIONS

This application claims priority benefit of U.S. Provisional Application Ser. No. 61/808,628 filed Apr. 5, 2013; the contents of which are hereby incorporated by reference in their entirety.

FIELD OF THE INVENTION

The present invention relates to new compositions of matter for carbon, and more particularly, carbonized carbons and new applications of the new carbon compositions to articles formed by embedding the carbonized carbon in a matrix that takes advantage of the properties of the carbonized carbon.

BACKGROUND OF THE INVENTION

The element Carbon is ubiquitous for many reasons, one of which is the many valences and thus forms in which carbon can be realized in physical embodiments. Carbons are the basis for all earthborn life, for other carbonaceous materials, and for the most prevalent forms of combustible fuels, as well as many other valuable economic properties.

Carbon-based combustible fuels are burned or oxidized to release energy, typically in the form of heat, which is then used for economically advantageous purposes. Fuels based on carbon are typically divided into renewable/sustainable and non-sustainable fuel categories (e.g., biomass derived fuels vs. "fossil fuels").

Activated carbon is a form of carbon processed to be riddled with small, low-volume pores that increase the surface area available for adsorption or chemical reactions. Due to a high degree of microporosity, a single gram of activated carbon has a surface area in excess of 500 $m^2$, as determined by BET adsorption isotherms of carbon dioxide gas at room temperature. An activation level sufficient for useful application may be attained solely from high surface area; however, further chemical treatment often enhances adsorption properties. Activated carbon is usually derived from charcoal or coal, but can include the shells of nuts and other plant elements, as well as other harder forms of biomass.

Activated carbon is typically formed by either physical or chemical activation. In physical activation, the source material is developed into activated carbons using hot gases. Material with carbon content is pyrolyzed at temperatures in the range 600-900° C., in absence of oxygen to directly carbonize the source material. Typically, this process leads to low porosity and therefore low quality material. Iodine numbers of 20-30 are typical for carbon after pyrolysis. As an adjunct or alternative to expose a base material or carbonized material to oxidizing atmospheres (carbon dioxide, oxygen, or steam) under pressure up to 25 psi and at temperatures above 250° C., usually in the temperature range of 600-1200° C. to enhance porosity.

Chemical activation to form activated carbon involves impregnating the based material with reagents prior to carbonization. The reagent is typically an acid, strong base, or a salt (phosphoric acid, potassium hydroxide, sodium hydroxide, calcium chloride, and zinc chloride 25%). Then, carbonization and activation proceed simultaneously. While chemical activation is advantageous relative to physical activation owing to the lower temperatures and shorter time needed for activating material, the handling and cost of reagents, along with the noxious outgassing during carbonization mean that chemical activation has met with limited acceptance.

Important base materials for the production of activated carbon include coconut shells, palm shells, oil, husks, coal, petroleum, bitumen, and sawdust, all of which have to be reduced to almost pure carbon for activated carbon making. Activated carbon is readily formed as a powder of various dimensions, can be pelletized with a binder, and is used as a substrate for various reactants and catalysts. Activated carbon is also applied to chemical warfare resistant clothing and placed in a biocompatible polymeric matrix to perform haemoperfusion.

Activated carbon also finds applications including to bleach and to absorb odors in the sugar industry, to produce cooking oil, to manufacture batteries and energy storage devices, and to purify air, water, and various chemicals.

Owing to the wide ranging uses of various forms of carbon and electrically charged and activated carbon, there exists a need to produce novel materials and activated carbon in a less energy intensive and polluting form that still has properties for various applications that provide value to consumers and industry, while contributing to a significant reduction in greenhouse gases.

SUMMARY OF THE INVENTION

An inventive composition is provided that includes: an inventive carbonized carbon having an iodine number of at least 60 mg/g or a positive or negative charge and a domain size of between 1.0 and 2.3 nm. Embodiments of the carbonized carbon may have a particle size of more than 90 weight percent being less than 100 mesh, a particle size of more than 90 weight percent being less than 200 mesh, and a particle size of more than 90 weight percent being less than 325 mesh. The composition of the carbonized carbon may have an iodine number of at least 75 mg/g and the domain size of between 1.0 and 1.6 nm.

An inventive article is provided that includes: a polymer forming a matrix with the inventive carbonized carbon, the polymer being one of a polyalkylenes, polycarbonates, polylactones, polycarboxylic acids, polyvinylpyrrolidones, polyacrylates, polyols, polyurethanes, polyureas, polyesters, polystyrenes, fluoropolymers, elastomers, and block co-polymers thereof, where the carbonized carbon is present at or above a percolation threshold.

An inventive carbon black derived from wood is provided that has been assigned a new CAS number (CAS#1362167-53-0) in a new category of materials (wood, carbonized) that exhibits newly developed process methods, newly emergent characteristics, and new uses. These new uses include the ability to color plastics as a substitute or extender for carbon black, derived from heavy petroleum oils, and to act as a source of liquid fuel, when mixed with water and certain very low percentage emulsifiers/surfactants, in robust combustion systems as a substitute for diesel fuels; e.g., in diesel locomotive engines, generators, boilers, home heating systems, and the like. A liquid fuel is also produced by combining the inventive material upon combination with biomass, and alcohols, such as methyl alcohol. In some embodiments, an anti-freeze is also provided to yield a winterized version of this fuel. Agricultural applications of an inventive material include a seed coating and a soil amendment.

DETAILED DESCRIPTION OF THE INVENTION

The present invention has utility as organically derived carbon black and as carbonized carbon operative in various applications including the aforementioned along with articles containing the inventive carbonized carbon that take advantage of the properties thereof, especially the charge carrying properties thereof.

It is to be understood that the terminology used herein is for the purpose of describing particular embodiments of the invention only, and is not intended to limit the scope of the invention in any manner. It must be noted that, as used in this specification and the appended claims, the singular forms "a," "an" and "the" include plural referents unless the content clearly dictates otherwise. Thus, for example, reference to a "filler" may include two or more such fillers. Unless defined otherwise, all technical and scientific terms used herein have the same meaning as commonly understood by one of ordinary skill in the art to which the invention pertains.

As used herein, the terms "carbonized waste," "carbonaceous product" and "carbonaceous material" are used interchangeably to define solid substances at standard temperature and pressure that are predominantly inorganic carbon by weight and specifically include carbonized carbon with its specific combination of characteristics which result in its ability to be employed in novel uses.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

The American Chemical Society operates a system in which the society attempts to catalog every known physically and commercially realized chemical compound called the Chemical Abstracting Service or "CAS". The CAS catalog is the acknowledged international standard for such classification systems.

Carbonized carbon activity is measured by a variety of methods including iodine number. As used herein iodine number is expressed in mg iodine per gram of carbonized carbon and is measured per ASTM D28.

Using an improved process of carbonization, as detailed in U.S. patent application Ser. No. 13/927,904; filed Jun. 26, 2013 entitled; "Chain Drag Carbonizer, System and Method for the Use Thereof" and filed with common inventorship and ownership ("the '904 Patent Application"), a new composition of matter with an assigned trade name of ORGANIC BLACK™ is produced, and assigned a new CAS number (CAS No. 1362167-53-0) in an entirely new category of material (wood, carbonized) that exhibits newly developed process methods, newly emergent characteristics, and new uses. These new uses include the ability to color plastics as a substitute or extender for carbon black, derived from heavy petroleum oils, and to act as a source of liquid fuel, when mixed with water and certain very low percentage emulsifiers/surfactants, in robust combustion systems as a substitute for diesel fuels; e.g., in diesel locomotive engines, generators, boilers, home heating systems, and the like. Using co-produced, derived biomass, and alcohols, such as methyl alcohol, also mixed in, in small quantities, as an anti-freeze, a winterized version of this fuel may also be obtained.

Embodiments of the previously disclosed and aforementioned inventive Drag Chain Carbonizer provide an apparatus and process for anaerobic thermal transformation processing to convert waste into bio-gas, bio-oil, carbonized materials, non-organic ash, and varied further co-products. In the inventive technology presented herein, any carbonaceous waste is transformed into useful co-products that can be re-introduced into the stream of commerce at various economically advantageous points. The present invention is a novel carbonized carbon with a wide variety of new uses, which requires the novel process of carbonization enabled by the inventive Drag Chain Carbonizer, to produce the novel carbon from biomass and its woody components. It is appreciated that various synthetic waste products (such as synthetic carbon based polymers) and thermoset resins are also readily pyrolyzed to produce novel forms of carbonized carbon according to the present invention. These synthetic polymers and thermoset resins are commonly found in medical waste, scrap sheet molding compositions, industrial scrap and recycled consumer plastics. It is of note that conventional products such as coke derived from coal, or carbon black derived from petroleum or natural gas, contains numerous hazardous materials including but not limited to mercury, radioactive elements, other toxic metals, and polycyclic aromatic hydrocarbons (PAH's).

In a specific embodiment, when the carbonization system is operated at temperatures above 850° F., with negative internal chamber pressures, and with dwell times that exceed 5 minutes but less than 1 hour, to process biomass and its woody components, a new form of carbon, "carbonized wood" that is assigned CAS No. 1362167-53-0, is produced. The inventive carbonized composition has specific characteristics that sufficiently distinguish it from all other known and catalogued carbon materials to cause the CAS to create a new CAS number and descriptor for this composition.

It is noted that an inventive composition is also produced in some inventive embodiments by processing via chemical, water washing, centrifuging, membrane or other filtering, pulverizing, agglomerating, and other further pre- and post-processing techniques to produce black carbon products, including the physical processes required to aggregate the carbon into pearls and/or agglomerates. Additionally, it is appreciated that other products of this inventive process include alcohols, esters, oils and waxes that are amenable to collection and optional subsequent processing or introduction as a source of thermal energy in various forms. Subsequent oil processing components illustratively include centrifuges for separating light and heavy oils, various filter strategies for separating co-product output elements, crushers and pulverizers, and the like. An inventive carbonization system in certain specific inventive embodiments utilizes a thermo-chemical reactor that may be, but not limited to, a drag-chain reactor, batch, continuous-stirred-tank, and a plug-in reactor.

The novel carbonized compositions exhibit the following general physical characteristics: greater than normal iodine numbers before activation, more cumulative surface area than normal wood carbons, specifically managed remaining non-fixed carbon percentages, low moisture and ash percentages, and managed particle sizes within a tight range sufficient to support even dispersion in plastic resins and suspension in water or other aqueous or non-aqueous solutions for significant periods of time.

In addition according to embodiments of the present invention, carbonized carbon composition is produced that has an iodine number of greater than 60, and in some embodiments greater than 75 through a single-step pyrolysis process as detailed in the '904 Patent Application. The base carbon so produced is also noted to have a charge stabilization capacity that exceeds that of carbonized carbons of a like iodine number produced by conventional physical or chemical activation processes. The resultant iodine number for the carbonized carbon arising from this base carbon has an iodine number exceeding 600 using just basic physical or steam activation.

In addition, other physical and chemical processes can be used to uniformly charge the base carbon so that it takes up an electrical charge of either a positive or negative nature. Hereinafter, these various charged and carbonized carbons will be referred to as "carbonized carbons" for simplicity of explanation. It is appreciated that the iodine number is function of factors illustratively including the source of base material from which the carbonized carbon is formed, gas treatment, and impregnation with various chemicals such as metal ions. The iodine number also does not necessarily measure the electrical charging capacity of the carbonized carbon; instead techniques such as electrical capacitance and discharge testing are used to determine charging capacity.

A polymeric matrix is provided in certain embodiments in which an inventive composition is dispersed. Polymers suitable for mixing with the carbonized carbon are limited only by compatibility with carbonized carbon. Polymers operative herein illustratively include polyalkylenes such as polyethylene, polypropylene, polycarbonates, polylactones, polycarboxylic acids, polyvinylpyrrolidones. Polyacrylates, polyols, polyurethanes, polyureas, polyesters, polystyrenes, fluoropolymers, elastomers, and block co-polymers containing subunits of any of the aforementioned polymers; polysiloxanes; and silicones. A binder solution in some inventive embodiments are poly(carboxylic acid) and a crosslinking agent in water. In some inventive embodiments, polymer binders have a molecular weight of at least 10,000. In some inventive embodiments, polymer binders have a molecular weight of less than 500,000.

The inventive carbonized carbon composition can be readily mixed into a thermoplastic melt, pressed into formed sheets of thermoplastic material, or mixed with thermoset polymer precursors. In some embodiments, a powered carbonized carbon material can be ground to a desired mean particle size prior to introduction into a polymer or polymer precursor. The carbonized carbon can be added in powdered form or as a slurry in a solvent. The carbonized carbon of the present invention is formed from a variety of base materials that illustratively include cellulosic sources such as wood, coconut shells, wheat chaff, corn stover, nut shell and hulls, grasses, bone meal, carpet waste, auto shredder waste, coal, bitumen, petroleum; sewage, medical waste; and fecal waste. The inventive carbon composition in certain embodiments should have a minimum iodine number of 60 mg/g. The pH associated with the carbonized carbon is neutral or slightly acidic.

The polymer or precursors thereof are readily mixed with the carbonized carbon neat, or in a solution. Generally, highly molecular weight polymers are either melted and mixed with carbonized carbon with degassing or dissolved in a solvent and subsequent to mixing evaporated to drive off residual solvent. Thermoset polymer precursors are in certain embodiments simply mixed directly with carbonized carbon. In instances when a polymer or precursor thereof is solvated prior to mixing with carbonized carbon, the solvent is typically present at 60-98% by weight relative to the polymer. Preferably, the solvent employed in accordance with the present invention is free from VOCs (volatile organic compounds). It is appreciated that other non-VOC solvents are also operative herein and are optionally present at levels of reduced regulatory concerns. VOC exempt solvents operative herein illustratively include water, dimethylcarbonate, propylene carbonate and tert butyl acetate and the like. It is appreciated that such solvents also readily includes one or more conventional additives of cure catalysts, plasticizers, dyes, pigments, UV stabilizers, and various fillers, including base carbon that are conventional to processing a given polymer.

An inventive article is readily formed from powdered inventive carbonized carbon composition, which is agglomerated with the polymer to the desired size of the final product in a variety of forms including pellets, sheets, and complex molded shapes formed by molding techniques. In certain inventive embodiments, a powdered carbon is 90 weight percent smaller than 100 mesh. In still other inventive embodiments the carbonized carbon is 90 weight percent smaller than 200 mesh, and still other inventive embodiments the carbonized carbon is 90 weight percent smaller than 325 mesh.

The inventive carbonized carbon composition and polymer are readily mixed and processed in an apparatus for mechanical spheronization to yield the mechanical shapes of granules or beads, placed on a mold platen, extruded, or injection molded as are conventional to the art. Mechanical spheronization is readily performed with equipment illustratively including a pin mixer, or an Eirich mixer in combination with a disk pelletizer or spheronizer.

Without intending to be bound to a particular theory, through production of carbonized carbon in a drag chain pyrolysis apparatus operating under rapid carbonization conditions and an atmosphere in which liquid organics and water vapor are removed from the processing atmosphere, carbonized carbon is produced in a single step that has a higher pore volume in the up to 2 nanometer (nm) size range than achieved by conventional processes, and with sufficient heat produces a higher graphitic content than is seen in conventional carbonized carbon. This higher graphitic content is manifest as a higher conductivity than conventional carbonized carbon having the same iodine number.

In other inventive embodiments, the carbonized carbon has a higher electrical charge carrying capacity than conventional carbonized carbon having the same iodine number, presumably due to the higher graphitic content. Furthermore, a small domain size is noted for the inventive carbonized carbon that is coupled with a high iodine number.

An additional application of the inventive activated carbon composition is in the field of agriculture. The activated carbon composition acts a soil amendment that absorbs salts and minerals. Furthermore, the activated carbon composition may be added to furrowed land to serve as a growth lattice for water retention and microbe growth prior to adding the seeds, fertilizers and other nutrients.

Figure 1:
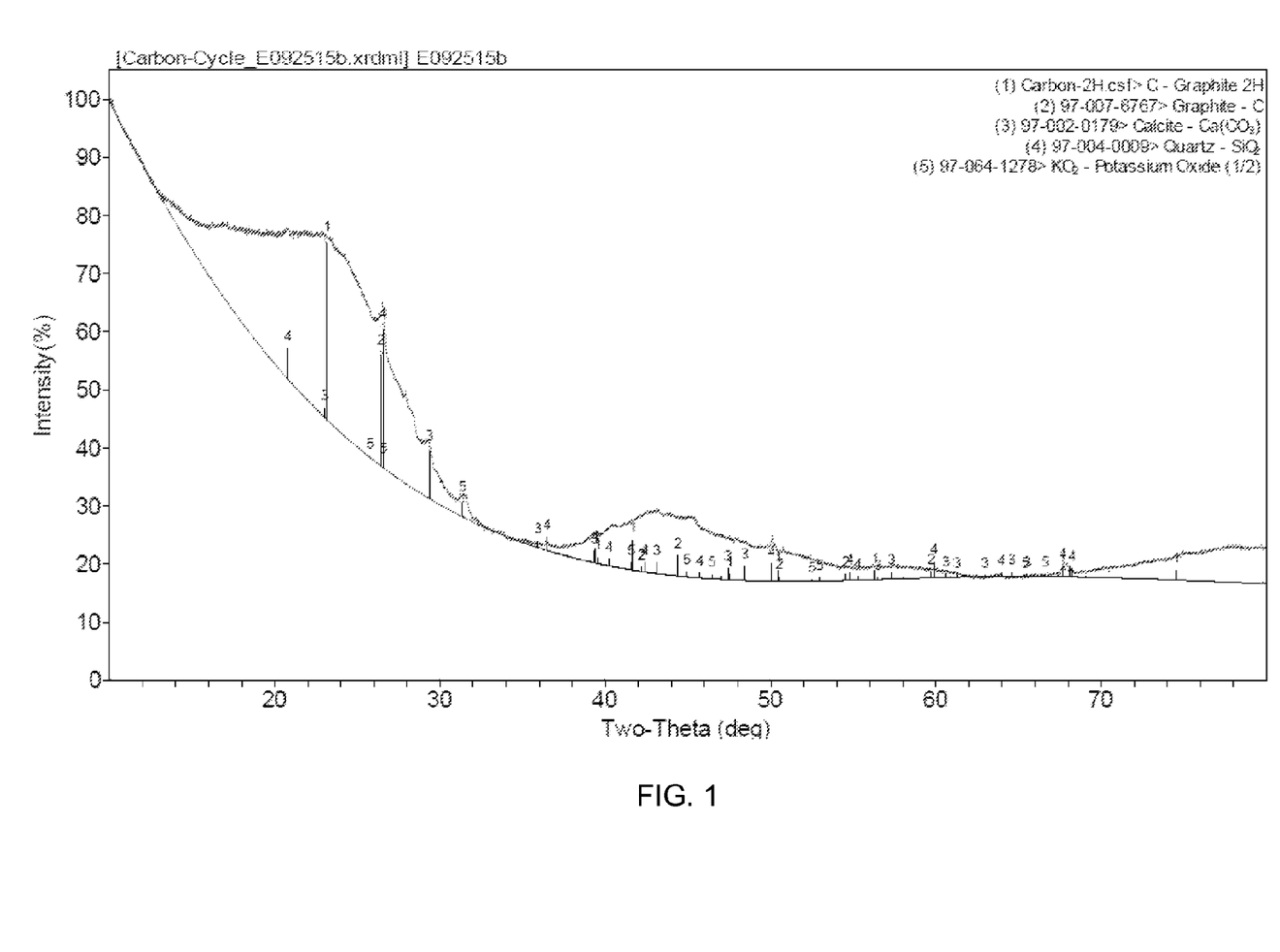
FIG. 1 is an X-ray powder diffraction pattern of carbonized carbon according to the present invention.
Figure 5:
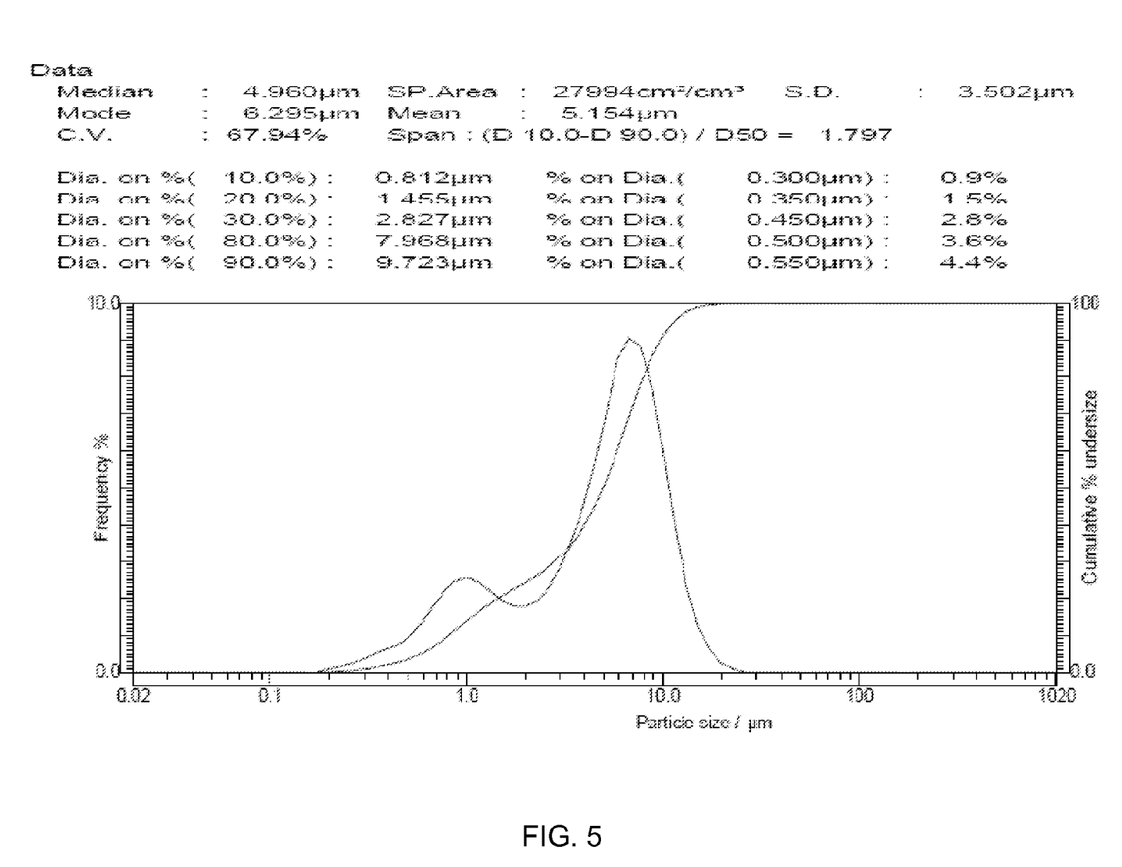
FIG. 5 is a graph of the particle size distribution for the inventive carbon black.

Referring now to the figures, FIG. 1 is an X-ray powder diffraction pattern of carbonized carbon according to the present invention. As shown in FIG. 1, the inventive carbonized carbon is characterized by a broad peak in the X-ray powder diffraction pattern (XRPD) centered at about 23.5 degrees and extending between 8 and 10 degrees two theta on either side of the peak. This corresponds to a carbonized carbon domain size, within larger granules of 1.2 nm based on Debye-Scherer line broadening in XRPD. Domain sizes as measured by XRPD for the carbonized carbon of the present invention are typically between 1.0 and 2.3 nm; and in some embodiments between 1.0 and 1.6 nm. As a result, in an article formed from the inventive carbonized carbon can support a higher overall effective surface charge than conventional components. As such, a capacitive polymeric article is formed. Alternatively, polymeric materials such as expanded polystyrene that are prone to static build up are rendered more charge neutral through a quantity of the inventive carbonized carbon. It is appreciated that carbonized carbon present at an amount at or above the percolation threshold for the carbonized carbon are rendered conductive thereby making the resulting article suitable for a variety of applications previously not able to be serviced by carbonized carbon filled polymers. FIG. 5 is a graph of the particle size distribution for the inventive carbon black.

These applications include powder primeable articles, and filters that simultaneously offer size dependent and electrostatic separation or purification A polymer containing carbonized carbon according to the present invention is readily formed into a variety of articles such as a battery component, a fluid medium filtration membrane, an energy storage or transmission component, or sheeted and charged layers for use in either transmission or dispersion of an electrical charge.

Figure 2A:
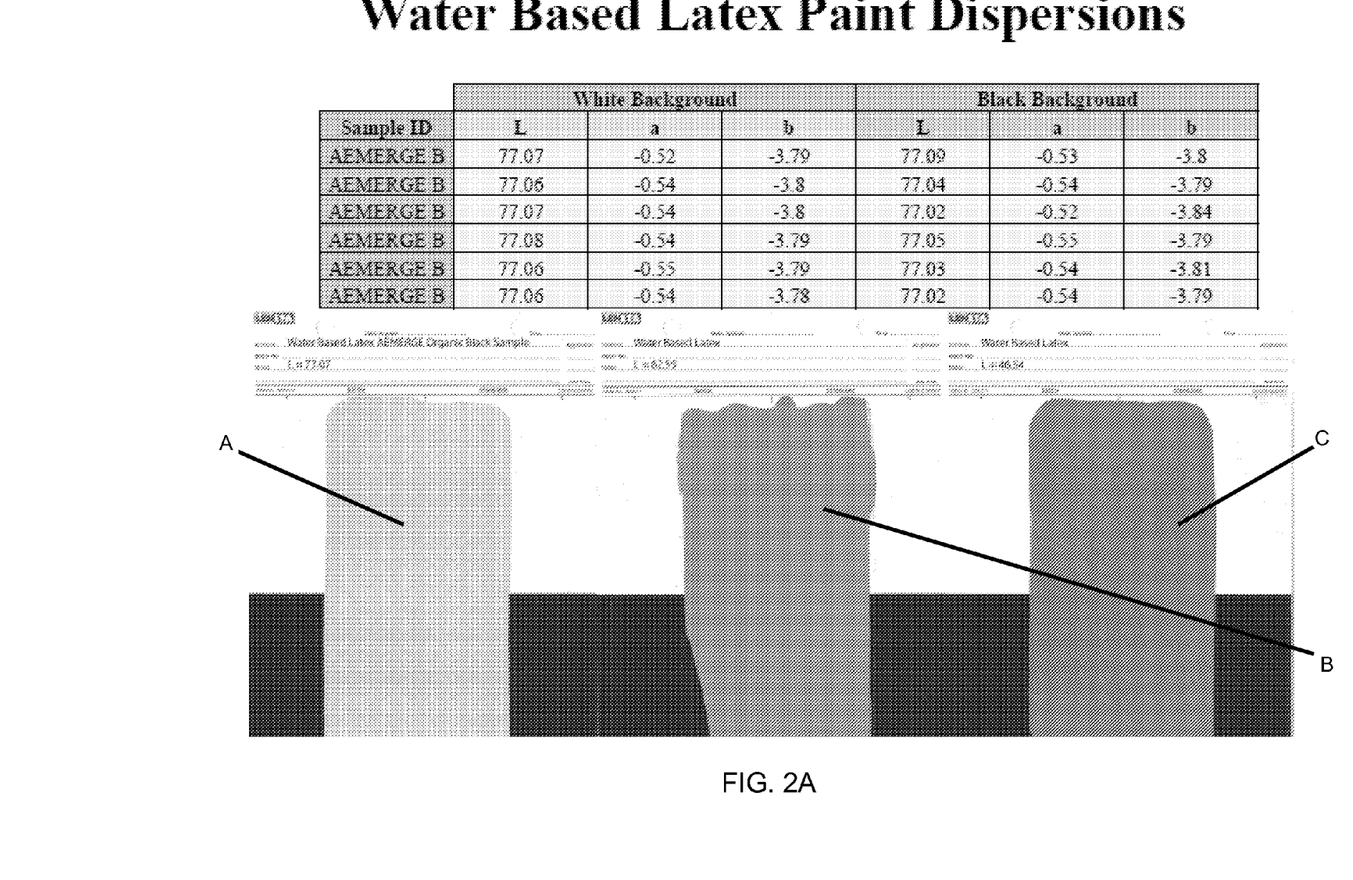
FIGS. 2A and 2B illustrate the coloration effect of mixing the inventive carbonized carbon in various bases, such as latex and acrylic based paints.
Figure 2B:
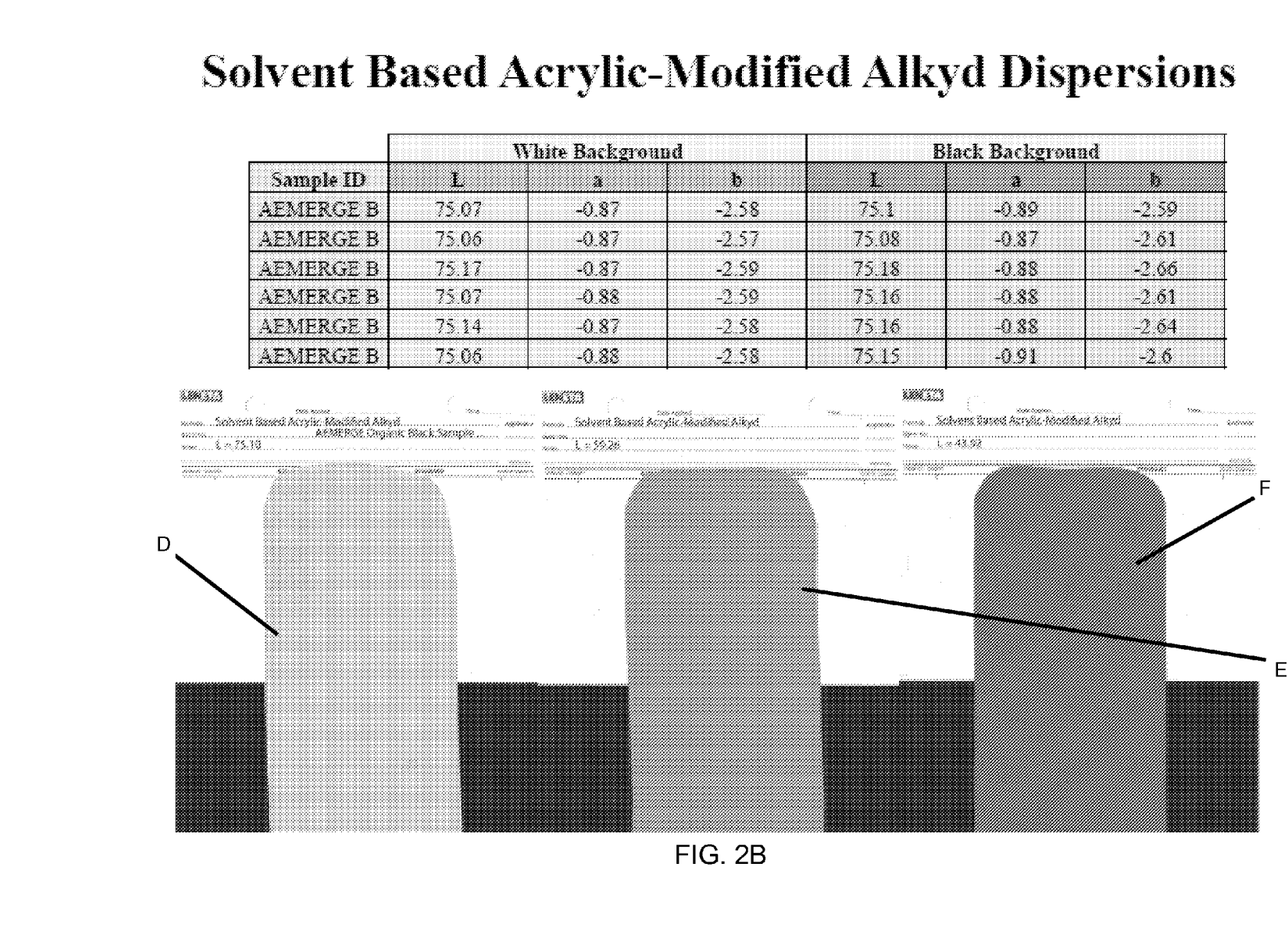

FIGS. 2A and 2B illustrate the coloration effect of mixing the inventive carbonized carbon composition in various bases, such as aqueous inks, plastics, latex and acrylic based paints. FIG. 2A illustrates water based latex paint dispersions on a white and black backgrounds. Applied paint samples are also shown, where sample A has the inventive carbonized carbon in the water based latex with an L=77.07, sample B is a standard water based latex paint with an L=62.55, and sample C is a standard water based paint with a CIE lightness value (L), L=46.54. FIG. 2B illustrates paints that are solvent based acrylic-modified alkyd dispersions on a white and black backgrounds. Applied paint samples are also shown, where sample D has the inventive carbonized carbon in the solvent based acrylic alkyd with an L=75.10, sample E is a standard solvent based acrylic alkyd paint with an L=59.26, and sample F is a standard solvent based acrylic alkyd paint with an L=43.92.

Figure 3A:
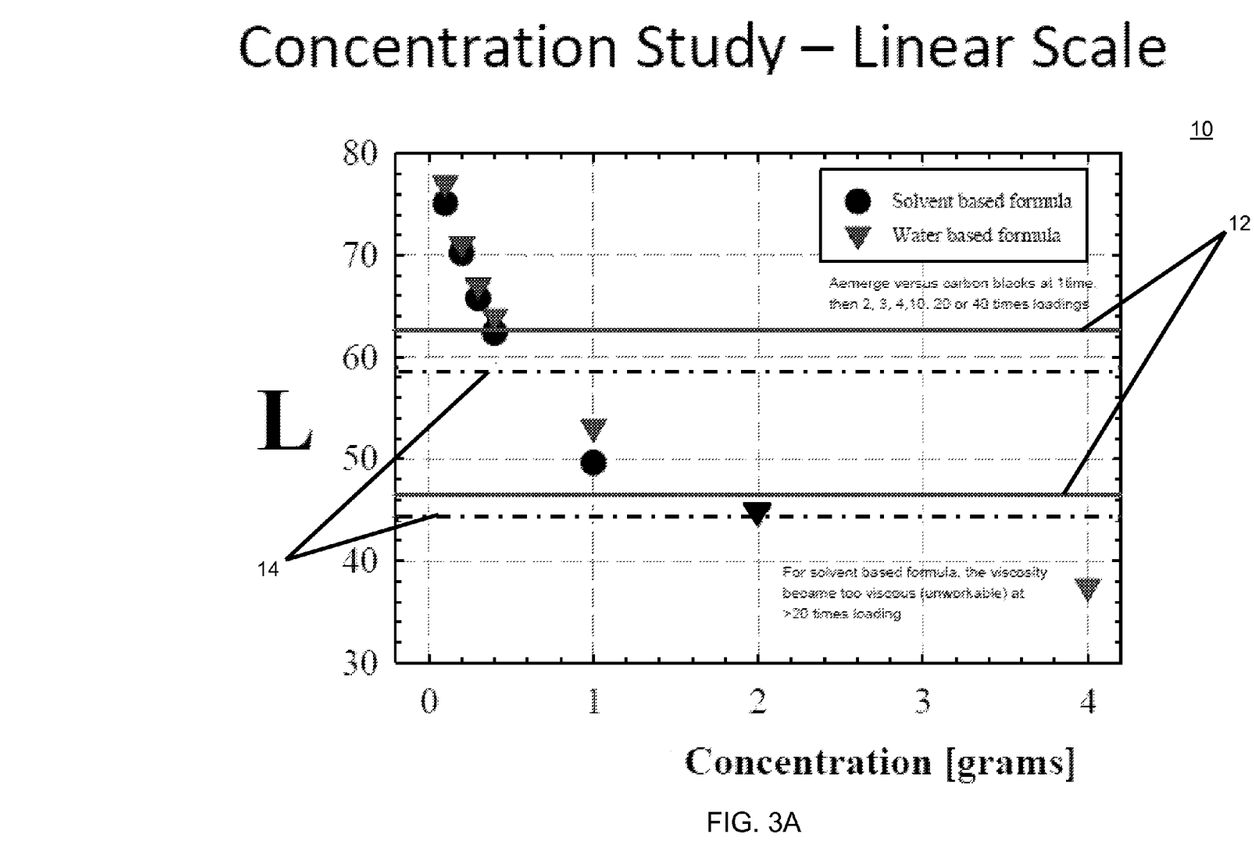
FIG. 3A is a linear scaled graph illustrating the results of a concentration study for solvent and water based formulas.
Figure 3B:
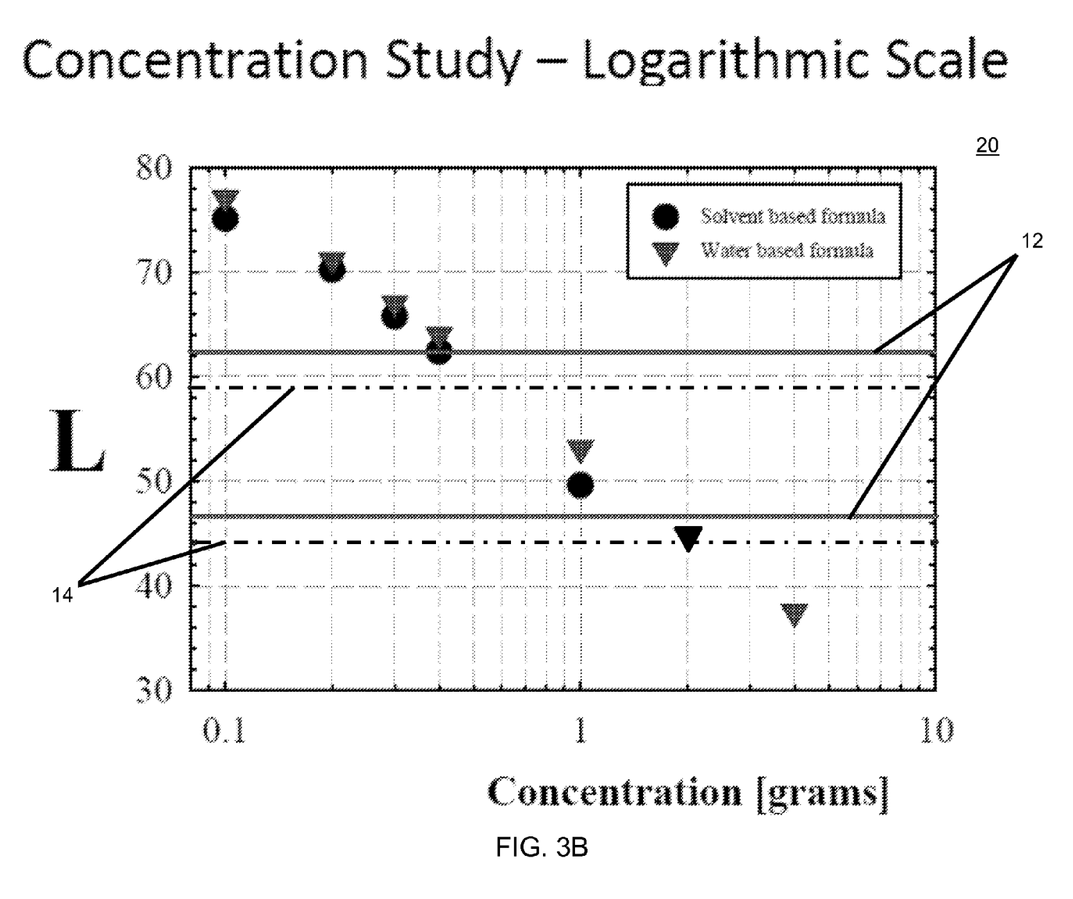
FIG. 3B is a logarithmic scaled graph illustrating the results of a concentration study for solvent and water based formulas.

FIG. 3A is a linear scaled graph 10 illustrating the results of a concentration study for solvent and water based formulas under various loadings. The solid lines 12 represent the range where furnace blacks are at a concentration of 0.1 grams of carbon black in water (latex paint) systems. The dotted lines 14 show the same performance for solvent based paints. For solvent based formula, the viscosity became too viscous (unworkable) at greater than twenty times loading. FIG. 3B is a logarithmic scaled graph 20 illustrating the results of a concentration study for solvent and water based formulas.

Figure 4:
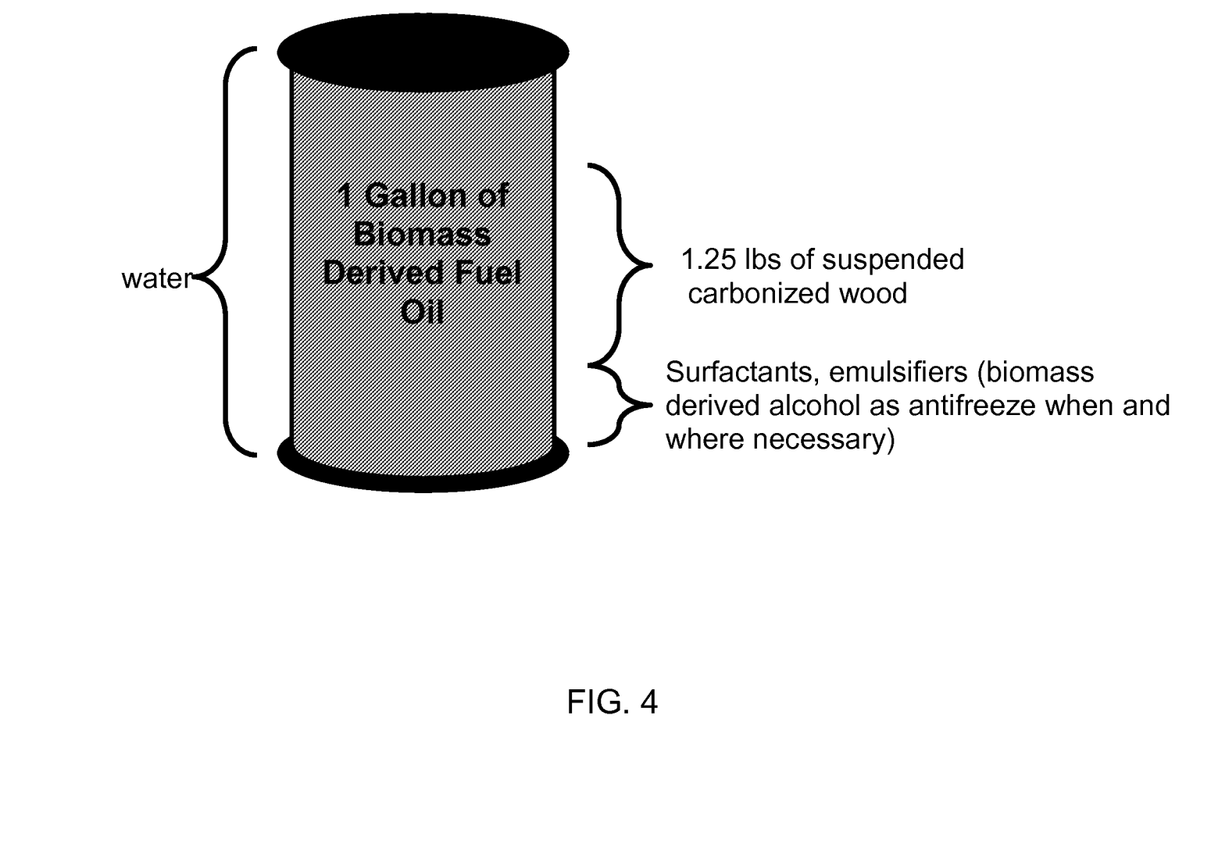
FIG. 4 is schematic representation of a combustible fuel based on carbonized carbon according to an embodiment of the invention.

FIG. 4 is schematic representation of a combustible fuel based on an inventive carbonized carbon composition. As shown in FIG. 4, one gallon of biomass derived fuel oil is formulated with water and 1.25 pounds of the inventive carbon composition suspended in the water. In addition, surfactants and emulsifiers (biomass-derived alcohol as antifreeze is added when and where necessary).

Any patents or publications mentioned in this specification are herein incorporated by reference to the same extent as if each individual publication was specifically and individually indicated to be incorporated by reference.

The foregoing description is illustrative of particular embodiments of the invention, but is not meant to be a limitation upon the practice thereof.

The invention claimed is:

1. A composition comprising:
   carbonized carbon having an iodine number of at least 60 mg/g or a positive or negative charge and a domain size of between 1.0 and 1.6 nm, a plurality of carbonized carbon domains joined to form a particle with a particle size.

2. The composition of claim 1 wherein the particle size of more than 90 weight percent is less than 100 mesh.

3. The composition of claim 1 wherein the particle size of more than 90 weight percent is less than 200 mesh.

4. The composition of claim 1 wherein the particle size of more than 90 weight percent is less than 325 mesh.

5. The composition of claim 1 wherein said carbonized carbon has the iodine number of at least 75 mg/g.

6. The composition of claim 1 wherein the composition has a neutral pH.

7. The composition of claim 1 wherein said carbonized carbon is formed from a variety of base materials comprising cellulosic sources.

8. The composition of claim 7 wherein said cellulosic sources comprise wood, coconut shells, wheat chaff, corn stover, nut shell and hulls, and grasses.

9. The composition of claim 7 wherein said base materials further comprise bone meal, carpet waste, auto shredder waste, coal, bitumen, petroleum, sewage, medical waste, and fecal waste.

10. An article comprising:
    a polymer forming a matrix; and
    the composition of claim 1 with the matrix.

11. The article of claim 10 wherein said polymer is one of a polyalkylenes, polycarbonates, polylactones, polycarboxylic acids, polyvinylpyrrolidones, polyacrylates, polyols, polyurethanes, polyureas, polyesters, polystyrenes, fluoropolymers, elastomers, and block co-polymers thereof.

12. The article of claim 10 wherein said carbonized carbon is present at or above a percolation threshold.

13. A process of forming a composition according to claim 1 comprising:
    placing a waste material in a carbonization system, said carbonization system operated at temperatures above 850° F, with a negative internal chamber pressure, and with a dwell time that exceeds 5 minutes but is less than 1 hour.

14. A fuel comprising:
    a composition of claim 1; and
    water to form a suspension.

15. The fuel of claim 14 wherein said suspension further comprises surfactants.

16. The fuel of claim 14 wherein said suspension further comprises emulsifiers.

17. The composition of claim 1 dispersed in an agricultural field.

* * * * *